`2,926,975`

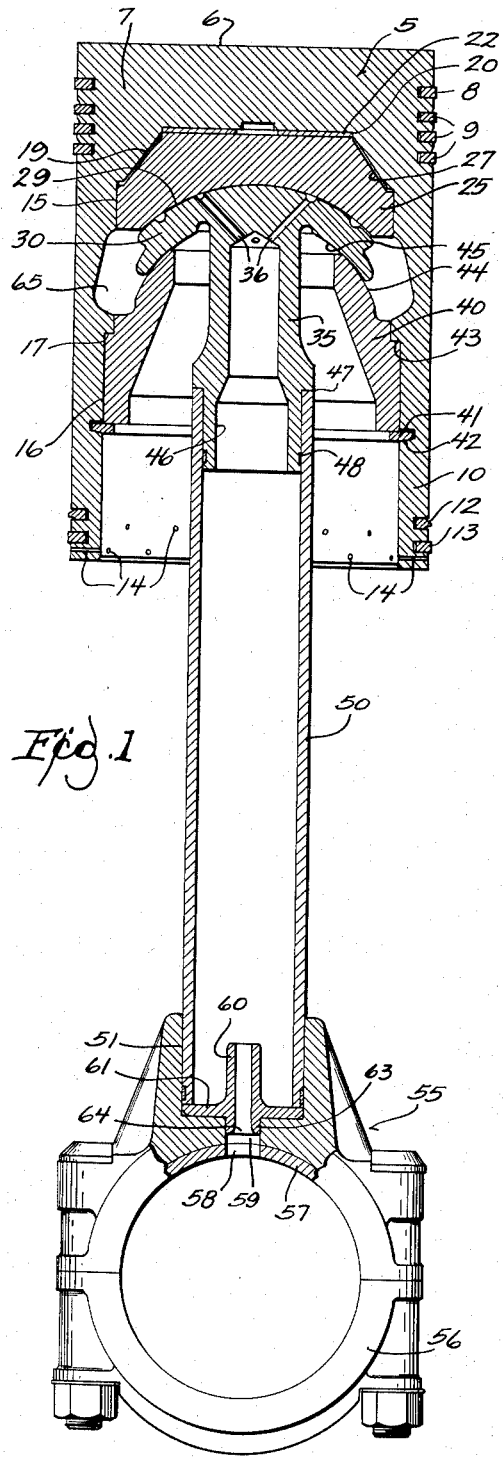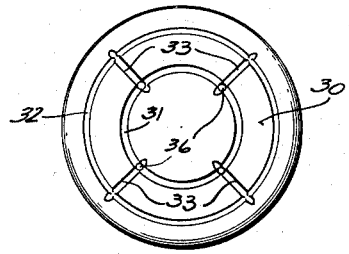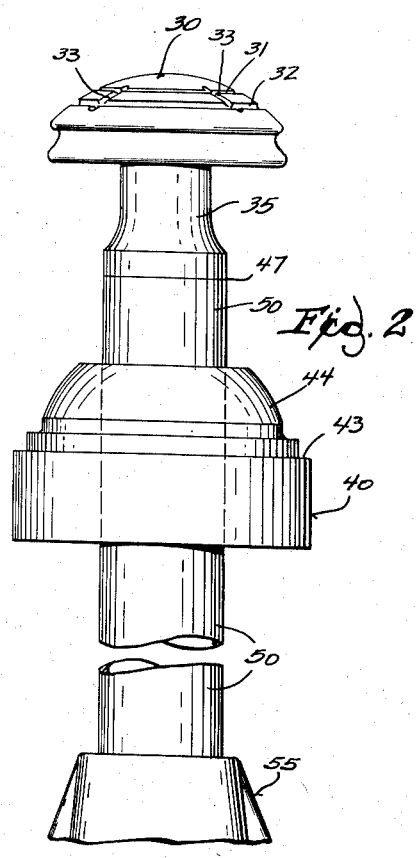

CONNECTING ROD AND PISTON ASSEMBLY

Klaus C. Karde, Crystal Lake, Merle W. Paquette, Carpentersville, and Willard V. Putz, Crystal Lake, Ill., assignors to Harnischfeger Corporation, Milwaukee, Wis., a corporation of Wisconsin Application May 8, 1957, Serial No. 657,866

6 Claims. (Cl. 309—20)

This invention relates to a connecting rod and piston assembly.

The invention seeks to provide an assembly particularly suited for the requirements of a two cycle internal combustion engine, although it may also be used in other engines and in pumps, compressors and the like. If used in a two cycle stroke engine, the piston solves problems having to do with the safe disposition of heat; assurance of proper lubrication; concentration of bearing pressure near the axis of the rod; economy of manufacture and ease of assembly and replacement.

The piston itself is a rotationally symmetrical body which is constrained for axial movement with the rod but is free for relative rotation upon its axis whereby it tends to equalize wear on all portions of its peripheral surface. It has a solid head of ample cross section for conducting heat from its terminal surface to the piston rings. The symmetrical design reduces piston head deformation to a minimum. Within the head, and protected from thermally conductive contact therewith, is a bearing member with a concave lower surface for engagement with a convex head on the connecting rod. This bearing member has radial fit within the piston but has no contact with the head, being spaced therefrom by a plate of low heat conductivity such as stainless steel or niresist.

The mushroom-shaped head at the end of the rod is downwardly concave and supported from below by an annular bearing member which has a close radial fit within the piston skirt and is confined against axial displacement by a square shoulder on the skirt and by a snap ring which supports the annular bearing member from below.

The connecting rod consists of three major parts. The rod proper is an ordinary tube desirably made of steel for economy and strength. At its upper end the tube is connected by soldering or by brazing or welding to a shank with which the mushroom-shaped head is provided. At its lower end, the tube is similarly connected to a generally conventional bearing structure which may be forged.

Fitted within the bearing structure is a restrictor nozzle which extends into the tubular midsection of the rod to promote flow of oil outwardly through the rod for the lubrication of the piston bearing. This restrictor fitting is distinguished by its ability to offer less resistance to outward flow than to inward flow. As the rod moves inwardly toward the crankshaft, the inertia of the lubricant within the tubular midsection of the rod promotes the flow of additional lubricant through the restrictor fitting. On the outward stroke, during which the inertia would tend to expel the lubricant back toward the crank, the differential action of the restrictor fitting tends to restrain such reverse flow with the result that there is a steady movement of lubricant outwardly through the rod.

In addition to the differential effect of the restrictor fitting, there is a difference between acceleration-deceleration pressures following top and bottom dead center and this difference also promotes lubricant flow outwardly.

The forging which provides the mushroom-shaped head and shank at the outer end of the rod is provided with oil distributing grooves in its bearing face and there are ducts opening through the head from the interior of the shank to convey the lubricant to such grooves. An important feature of the invention consists in the provision of complementary bearing surfaces on the rod and piston which are generally spherical but differ slightly in radius, the concave surfaces being of slightly greater radius than the convex surfaces. This concentrates bearing pressure near the axis of the rod and tends to float upon a film of lubricant those surfaces remote from the axis, thereby not only inducing the lubricant to flow outwardly across the surfaces from the grooves, but further minimizing friction between the parts.

In the drawings:

Fig. 1 is a view partially in side elevation but largely in axial section through a piston and rod assembly embodying the invention.

Fig. 2 is a fragmentary view in side elevation of the rod and bearing retainer as they appear when separate from the piston.

Fig. 3 is a plan view of the bearing surface of the mushroom-shaped head at the outer end of the rod.

There being no wrist pin, the piston 5 is completely symmetrical about its axis. It has a terminal face 6 exposed to combustion, if used in an internal combustion engine. Beneath this, the head portion 7 of substantial cross section is provided with peripheral grooves for conventional rings shown at 8 and 9. Its depending skirt 10 has additional grooves for oil rings at 12 and 13, these grooves being drained through the skirt by means of a number of ducts 14.

Interiorly, the piston has a bore at 15 and a counterbore 16 between which there is a right angle shoulder at 17. The cylindrical portion of bore 15 terminates below the rings 9. Above that level there is a conically tapered surface at 19 leading to a shallow recess 20.

Within the recess 20, there is seated a disc 22 of heat resistant material to provide a barrier between the piston head 7 and the upper connecting rod bearing member 25. The latter has a cylindrical side wall complementary to the bore 15 and having a close working fit in the upper end of said bore. It also has a tapered portion 27 which is spaced from the tapered surface 19 of the piston, being held in spaced relation thereto by engagement of the bearing member 25 with the disc or plate 20. This plate may conveniently be made of stainless steel or the like. Because of the use of this plate, the bearing member 25 has only lateral contact with the piston, and this occurs only at a point quite remote from the heated face 6 of the piston.

The lower or inner face 29 of bearing member 25 is spherically concave to receive the spherically convex head 30 of the connecting rod. The convex bearing face of head 30 is desirably provided with oil distributing grooves, a preferred arrangement of the grooves being clearly shown in Figs. 2 and 3. As here illustrated, the mushroom head 30 of the connecting rod has an inner circular groove 31 and an outer circular groove 32 and radial communicating grooves 33 at 90° intervals. The mushroom head 30 is forged integrally with a tubular shank 35 from which ducts 36 open outwardly into the oil groove 31.

There are substantial advantages in making the convex surface of the mushroom-shaped head 30 on a radius slightly smaller than the radius of the concave complementary surface 29 of bearing member 25, or otherwise providing clearance between head 30 and bearing member 25 which progressively increases outwardly from the axis. In practice, the difference in radius may approximate .15% of the radius. This provides about one thousandth of an inch increase in oil film thickness at the outer margin as compared with the axis.

The mushroom-shaped head 30 is supported in operative relation to the bearing member 25 by an annular bearing member 40 which is positioned within the piston by means of snap ring 41 engaged in the groove 42 in the interior of the piston skirt 10. Bearing member 40 has portions at differential radius forming a shoulder at 43 which is complementary to the shoulder 17 in the interior of the piston. Above this the member 40 extends outwardly at progressively decreasing radius, being provided at 44 which a bearing surface of generally spherical convex form complementary to the concavely spherical bearing surface 45 on the inner side of the mushroom-shaped head 30. Here again, it is found desirable that the surfaces at 44 and 45 be formed on slightly different radii to provide a clearance which progressively increases in an outward direction to a maximum approximating that above described. The total amount of bearing surface between the bearing member 40 and the mushroom-shaped head 30 is considerably less than that between the head 30 and the bearing member 25, the pressures to which the under side of the head is subject being very much less than the pressure of the piston toward the rod.

Telescopically sleeved onto the reduced radius portion 46 of shank 35 is the rod tube 50, the end of which desirably abuts shoulder 47 on the shank. A shallow groove at 48 on the reduced radius portion 46 of the shank may contain silver solder or the like as a means of connecting the shank and head to the rod tube 40. However, the connection may also be made by brazing, threading or welding if desired.

At its inner end, the rod tube 50 is telescopically received into a socket provided at 51 in a forging 55 which, together with the removable bearing cap 56, provides the crank bearing. The forgings 55 and 56 desirably have the usual bushing or bearing liner 57. Registering openings at 58 and 59 in the bushing and the forging 55 admit oil to the restrictor nozzle 60 which is mounted on a disc 61 seated in the bottom of socket 51 and engaged by the end of the rod tube 50. Connection of the rod tube to the forging 55 is made by silver solder, brazing, welding, or otherwise, as above described.

The restrictor nozzle 60 is tubular, having the greater portion of its length outwardly of the mounting disc 61. A shorter end portion 63 projects inwardly into the duct 59. In the extension 63 the bore through the tube 60 is flared as shown at 64.

For original production, the bearing member 40 is made in one piece. For replacement, in the event of injury, it is made in a plurality of pieces to facilitate its introduction without disassembling the parts of the rod. If the member is supported within the piston on the snap ring 42, it is immaterial whether it is made in one piece or a plurality of pieces.

When the assembly is in use, the rotation of the crank with which the connecting rod bearing 55 and cap 56 are engaged will cause the piston 5 to reciprocate in its cylinder (not shown) in the usual manner. The movement of the rod will, of course, be orbital at its inner end and substantially reciprocatory at its outer end, the movement in general mainly comprising longitudinal reciprocation.

In the course of that reciprocation, oil entering the rod through the aligned ducts 58 and 59 and bushing 57 and connecting rod bearing member 55 will pass outwardly through the tubular restrictor nozzle 60 into the interior of tube 50. In consequence of this differential action, there is a very substantial outward flow of lubricant through the tube 50 and the interior of shank 35 and the ducts 36 which open through the mushroom-shaped head 30 into the groove 31.

When the piston and rod are under relative compression, as occurs during inward movement of the piston in a two cycle engine or outward movement in a pump, the bearing pressure between the mushroom-shaped head 30 and the outer bearing member 25 tends to compress the lubricant between the concave surface 29 of the bearing member and the complementary grooved convex surface of the mushroom-shaped head 30 of the rod. Since there is progressively increasing clearance between these surfaces in an outward direction, the lubricant tends to be displaced radially outwardly into the relatively large accumulating chamber provided at 65 between the inner and outer bearing surfaces of the piston. The deviation between the convex and concave bearing surfaces should be so slight as to retain an operating film of lubricant. However, the surface area is so great that bearing pressures are low and there is no problem in this connection if the deviation is within the general order of that above indicated.

Consequently a relatively high rate of oil flow is provided which not only lubricates the bearing surfaces but cools them to carry off such heat as may reach the bearing surfaces notwithstanding the heat barriers provided as above described.

The lubricant in the chamber 65 can escape only between the relatively concave and convex bearing surfaces at 44 and 45 of the lower bearing member 40 and the under side of the mushroom-shaped connecting rod head 30. Under practically all normal operating conditions in a two cycle engine, there is clearance between surfaces 44 and 45 amounting in practice to .0035 to .007 inch. Consequently there is a ready return flow of oil between these surfaces from chamber 65 and back through the interior of the piston to the crankcase of the engine or pump.

The entire assembly is extremely light in weight as compared with conventional piston and rod assemblies for the handling of equivalent power. The steel tube has relatively great strength in relation to its weight. A heavy flow of lubricant occurs through the tube without requiring valves or other moving parts, by reason of the simple differentially effective nozzle 60.

Not only are the parts simple and well adapted to mass production, but they are capable of extraordinarily long life. Tests after prolonged usage have failed to show any appreciable wear of the bearings between the rod and piston. The piston itself is, of course, subject to minimum wear because it is entirely free to rotate on its own axis, and its symmetry about the axis eliminates any problems of unequal expansion.

I claim:

1. In a piston and connecting rod assembly, the combination with a rod having an interior oil passage, of means providing complementary convex and concave bearing surfaces between the piston and the end of the rod and to which said oil passage opens, the said surfaces being of different radii whereby to provide oil-accommodating clearance between said surfaces.

2. The combination set forth in claim 1 in which the concave surface has the greater radius, whereby the clearance between said surfaces increases progressively in a direction radially from the axis of the rod.

3. A piston and rod organization comprising the combination with a piston having a head and a skirt integral with the head and an interior cavity, of a separate bearing member within the cavity having a downwardly concave surface and having its sides in bearing engagement interiorly with the piston, means of low thermal conductivity spacing the bearing member from the head of the piston, a rod having a mushroom-shaped head with an outwardly convex face in bearing engagement with the concave face of the bearing member aforesaid, an annular bearing element mounted within the piston skirt and engaging the connecting rod head from below, the bearing element and head having complementary convex and concave surfaces, the piston and bearing element and bearing member aforesaid defining a chamber to which the periphery of the mushroom-shaped head is exposed and with which the bearing surfaces above and beneath said head communicate, and means for delivering lubricant through said rod and head to the convex outer surface of said head, said cavity being adapted to receive said lubricant.

4. A piston and rod organization comprising the combination with a piston having a head and a skirt integral with the head and an interior cavity, of a separate bearing member within the cavity having a downwardly concave surface and having its sides in bearing engagement interiorly with the piston, means of low thermal conductivity spacing the bearing member from the head of the piston, a rod having a mushroom-shaped head with an outwardly convex face in bearing engagement with the concave face of the bearing member aforesaid, an annular bearing element mounted within the piston skirt and engaging the connecting rod head from below, the bearing element and head having complementary convex and concave surfaces, the piston and bearing element and bearing member aforesaid defining a chamber to which the periphery of the mushroom-shaped head is exposed and with which the bearing surfaces above and beneath said head communicate, and means for delivering lubricant through said rod and head to the convex outer surface of said head, said cavity being adapted to receive said lubricant, the bearing surfaces of the mushroom-shaped head of the rod and the complementary surface of the bearing member and bearing element respectively having progressively increasing deviation radially from the axis of the rod whereby to provide for a lubricant film which is thicker toward the periphery of the mushroom-shaped head than toward the center thereof.

5. The combination with a tubular piston rod having a mushroom-shaped head with convex and concave outer and inner surfaces, and a piston providing bearing surfaces complementary to those of said head, of a differentially effective nozzle in said rod, the interior of the rod having a cavity about said nozzle and beyond the bottom of which the nozzle projects, said rod providing a passage leading therefrom outwardly of the rod through said head, the rod having a connecting rod bearing portion ported in communication with the nozzle.

6. A piston and rod organization comprising, in combination, a piston having a peripherally grooved head portion provided with rings and having a skirt extending beneath the rings, said skirt defining a cavity interiorly shouldered intermediate the length of the skirt and of reduced cross section toward the piston head portion, a bearing member peripherally fitted within the skirt of the piston and extending upwardly toward the head cavity in spaced relation to the piston, a thermally resistant spacer between the bearing member and the head portion of the piston, the bearing member having an inwardly concave and generally spherical bearing surface, a bearing element having a shoulder complementary to that of the bearing skirt, a retainer operatively engaged with the skirt and supporting the bearing element, the bearing element having an outwardly convex and generally spherical surface spaced from the concave surface of the bearing member aforesaid, and a connecting rod comprising a thin walled tubular portion, a mushroom-shaped head having a hollow shank connected at the outer end of the tubular portion and having outwardly convex and inwardly concave bearing surfaces engaged with the bearing surfaces of the bearing member and bearing element respectively, the concave bearing surface of said bearing member having a slightly greater radius than the complementary convex bearing surface of said head whereby the clearance therebetween accommodates a lubricant film which is thicker toward the periphery of the mushroom head than at the center thereof, the said mushroom-shaped head having openings from the interior of the shank providing communication between the thin walled tubular portion of the connecting rod and the outer convex bearing surface of the mushroom-shaped head thereof, a crank bearing having a socketed portion in which the thin walled connecting rod tube is telescopically engaged, nozzle means of less diameter than said tube and projecting into the tube, the bearing being ported in communication with the nozzle means and comprising a cap in detachable connection with the crank bearing.

References Cited in the file of this patent

UNITED STATES PATENTS

| | | |
|---|---|---|
| 1,609,449 | Williams | Dec. 7, 1926 |
| 1,637,765 | Comstock | Aug. 2, 1927 |
| 1,856,107 | Mellor | May 3, 1932 |
| 2,452,247 | Larsh | Oct. 26, 1948 |
| 2,670,726 | Spannhake | Mar. 2, 1954 |

FOREIGN PATENTS

| | | |
|---|---|---|
| 41,577 | Sweden | Apr. 7, 1915 |